United States Patent [19]
Takiguchi et al.

[11] Patent Number: 4,610,943
[45] Date of Patent: Sep. 9, 1986

[54] ELECTROPHOTOGRAPHIC PHOTOSENSITIVE MEMBER CONTAINS DISAZO PHOTOCONDUCTIVE COMPOUND

[75] Inventors: Takao Takiguchi, Tokyo; Hajime Miyazaki, Yokohama; Masakazu Matsumoto, Yokohama; Shozo Ishikawa, Yokohama, all of Japan

[73] Assignee: Canon Kabushiki Kaisha, Tokyo, Japan

[21] Appl. No.: 810,743

[22] Filed: Dec. 19, 1985

[30] Foreign Application Priority Data

Dec. 26, 1984 [JP] Japan .................. 59-272795

[51] Int. Cl.$^4$ .................................. G03G 5/06
[52] U.S. Cl. .................................. 430/76; 534/761; 430/57
[58] Field of Search ................ 534/761; 430/76

[56] References Cited

U.S. PATENT DOCUMENTS 4,568,623  2/1986  Makino et al. .................. 430/76

Primary Examiner—John D. Welsh
Attorney, Agent, or Firm—Fitzpatrick, Cella, Harper & Scinto

[57] ABSTRACT

An electrophotographic photosensitive member comprises a photosensitive layer containing a disazo pigment represented by the formula,

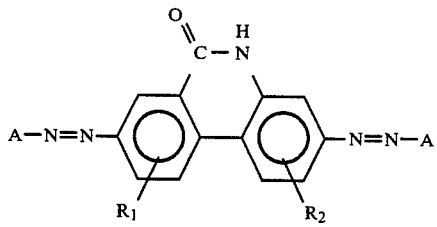

wherein $R_1$ and $R_2$, which may be either identical or different, each represent hydrogen atom, alkyl group, alkoxy group, halogen atom or cyano group, and A represents a coupler residue having a phenolic hydroxyl group.

6 Claims, No Drawings

ELECTROPHOTOGRAPHIC PHOTOSENSITIVE MEMBER CONTAINS DISAZO PHOTOCONDUCTIVE COMPOUND

BACKGROUND OF THE INVENTION

1. Field of the Invention

This invention relates to an electrophotographic photosensitive member, particularly to an electrophotographic photosensitive member containing a disazo pigment.

2. Description of the Prior Art

Heretofore, electrophotographic photosensitive members utilizing an inorganic photoconductive material such as selenium, cadmium sulfide, zinc oxide, etc. as the photosensitive component have been known.

On the other hand, since discovery of specific compounds exhibiting photoconductivity, a large number of organic photoconductive materials have been developed. For example, there have been known organic photoconductive polymers such as poly-N-vinylcarbazole, polyvinylanthracene, etc., organic photoconductive materials of low molecular weights such as carbazole, anthracene, pyrazolines, oxadiazoles, hydrazones, polyarylalkanes, etc., organic pigments or dyes such as phthalocyanine pigments, azo pigments, cyanine dyes, polycyclic quinone pigments, perylene type pigments, indigo dyes, thioindigo dyes or squaric acid methyne dyes, etc. Particularly, organic pigments or dyes having photoconductivity can be synthesized more easily than inorganic materials, and yet variation in selecting a compound exhibiting photoconductivity at an appropriate wavelength region can be expanded. For such reasons, a large number of proposals about photoconductive organic pigments or dyes have been made. For example, electrophotographic photosensitive members employing disazo pigments exhibiting photoconductivity as the charge generation substance in the photosensitive member separated in functions into the charge generation layer and the charge transport layer have been known, as disclosed in U.S. Pat. Nos. 4,123,270, 4,247,614, 4,251,613, 4,251,641, 4,256,821, 4,260,672, 4,268,596, 4,278,747 and 4,293,628.

The electrophotographic photosensitive member employing such an organic photoconductive material can be produced by coating by suitable selection of a binder, and therefore is very high in productivity and can provide inexpensive photosensitive members. Moreover, by selection of an organic pigment, the photosensitive wavelength region can be freely controlled. On the other hand, in spite of such advantages, this photosensitive member involves drawbacks in sensitivity and durability characteristics, and only a few have been practically applied up to date.

SUMMARY OF THE INVENTION

An object of the present invention is to provide a novel electrophotographic photosensitive member free from the above-mentioned drawbacks.

Another object of the present invention is to provide an electrophotographic photosensitive member having practical high sensitivity characteristic and stable potential characteristic in repeated uses.

According to the present invention, there is provided an electrophotographic photosensitive member comprising a photosensitive layer containing a disazo pigment represented by the formula:

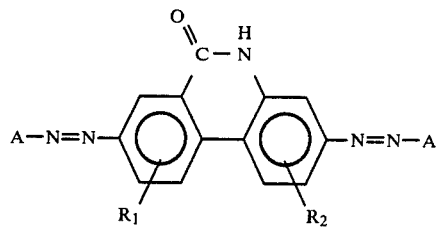

wherein $R_1$ and $R_2$, which may be either identical or different, each represent hydrogen atom, alkyl group, alkoxy group, halogen atom or cyano group, and A represents a coupler residue having a phenolic hydroxyl group.

DESCRIPTION OF THE PREFERRED EMBODIMENTS

The present invention is constructed of an electrophotographic photosensitive member which comprises a photosensitive layer containing a disazo pigment represented by the formula (1):

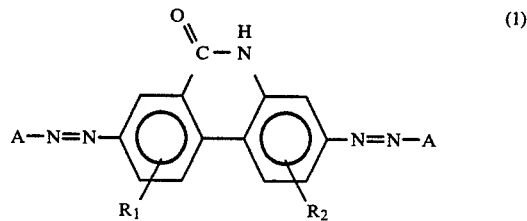

(1)

In the above formula, $R_1$ and $R_2$ may be either identical or different, and each represents hydrogen atom, an alkyl group such as methyl, ethyl, propyl, and the like, an alkoxy group such as methoxy, ethoxy, propoxy, butoxy, and the like, a halogen atom such as chlorine, bromine, iodine, and the like, nitro group or cyano group; A represents a coupler residue having a phenolic hydroxyl group. More preferable examples of the coupler residue represented by A are shown by the following formulae (2)–(6).

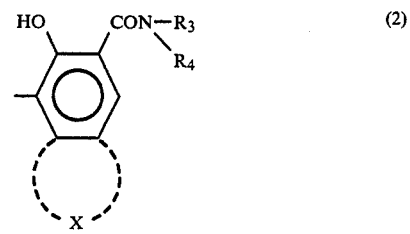

(2)

In the formula (2), X represents a residue necessary for formation of polycyclic aromatic ring and hereto ring such as naphthalene ring, anthracene ring, carbazole ring, benzcarbazole ring, dibenzofuran ring, benzonaphthofuran ring, diphenylenesulfide ring, and the like through fusion with benzene ring. $R_3$ and $R_4$ represent hydrogen atom, alkyl group, aralkyl group, aryl group, heterocyclic group or a cyclic amino group together with the nitrogen atom to which $R_3$ and $R_4$ are bonded which may have substituents. The alkyl group may include methyl, ethyl, propyl, butyl and the like, the aralkyl group benzyl, phenethyl, naphthylmethyl and the like, the aryl group phenyl, diphenyl, naphthyl, anthryl and the like, and the heterocyclic group dibenzofuran, benzimidazolone, benzthiazole, thiazole, pyridine and the like.

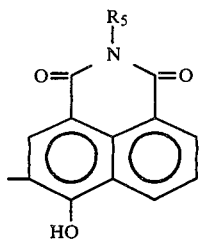

(3)

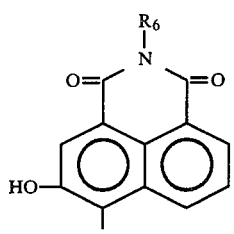

(4)

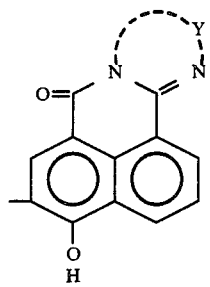

(5)

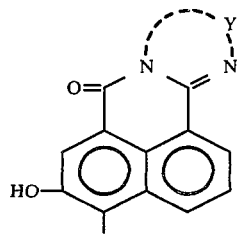

(6)

In the formulae (3) and (4), $R_5$ and $R_6$ each represent alkyl group, aralkyl group or aryl group which may have substituents, and specific examples of the respective substituents are the same as defined for the above $R_3$ and $R_4$.

Alkyl group, aralkyl group, aryl group or heteroxyclic group represented by the substituents $R_3$–$R_6$ in the above formulae (2)–(4) may be further substituted with other substituents for example, alkyl group such as methyl, ethyl, propyl, and the like, alkoxy group such as methoxy, ethoxy, propoxy, and the like, halogen atom such as chlorine, bromine, iodine, and the like, nitro group, cyano group, substituted amino group such as dimethylamino, diethylamino, diethylamino, dibenzylamino, diphenylamino, and the like.

In the formulae (5) and (6), Y represents a divalent group of an aromatic hydrocarbon or a divalent heterocyclic group containing nitrogen within the ring.

Typical examples of the disazo pigment to be used in the present invention are enumerated below.

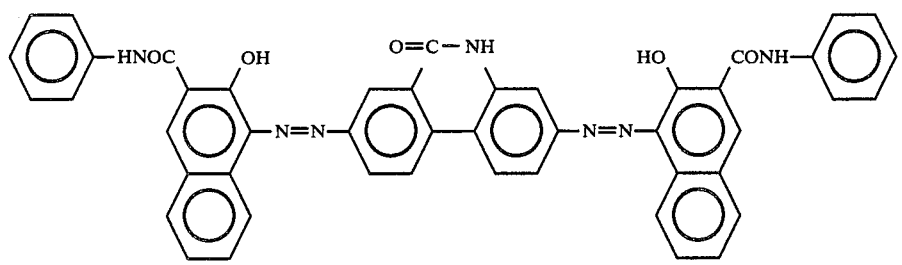

1.

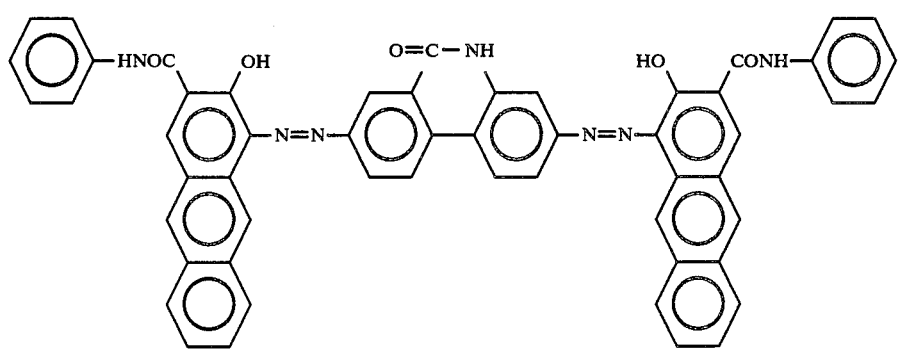

2.

-continued
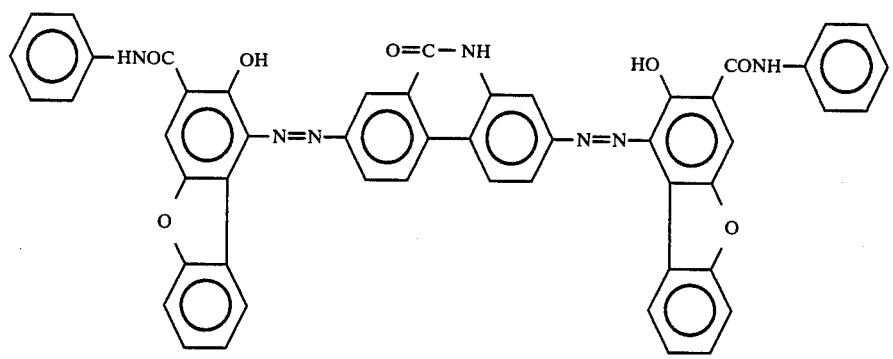
3.
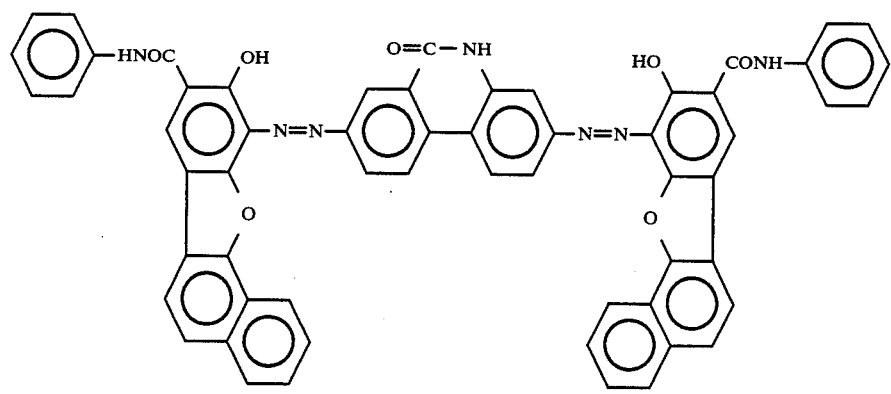
4.
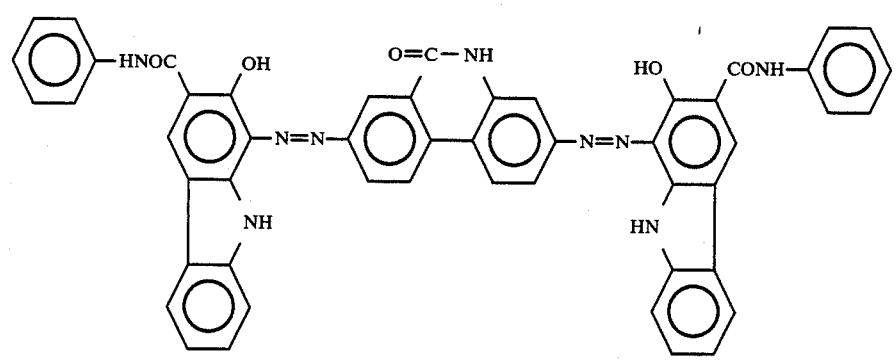
5.
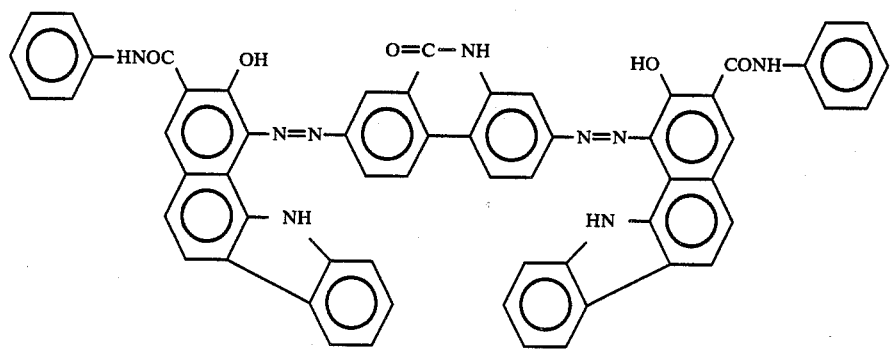
6.

-continued
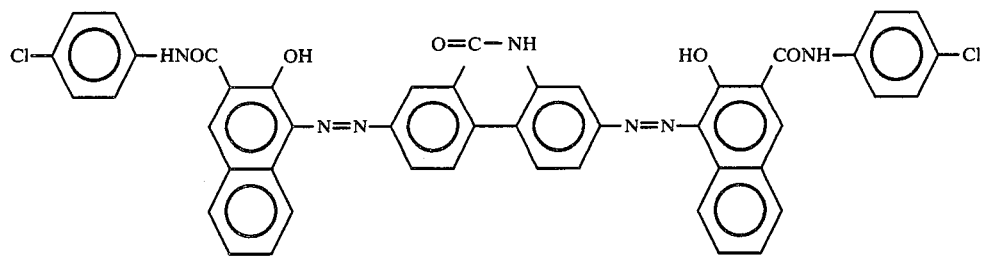
7.
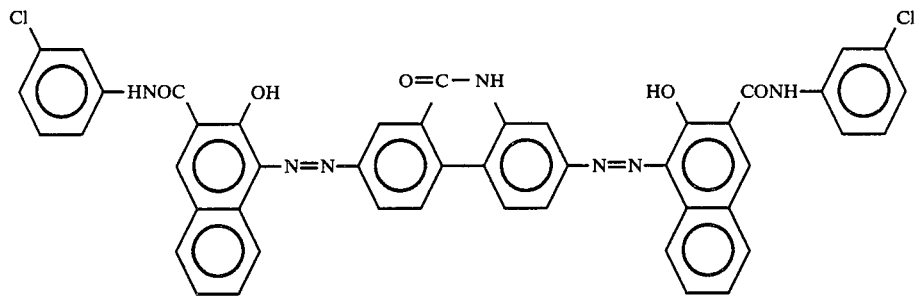
8.
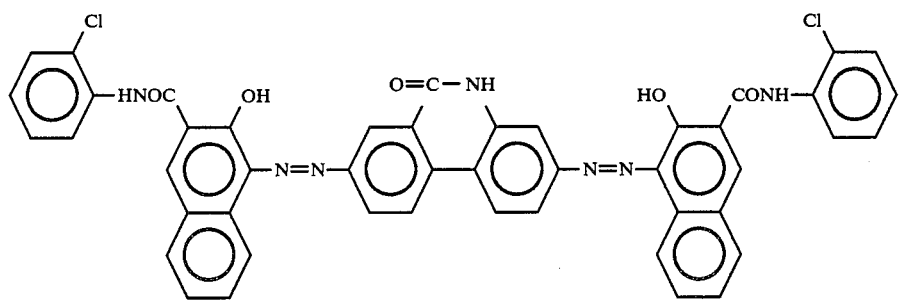
9.
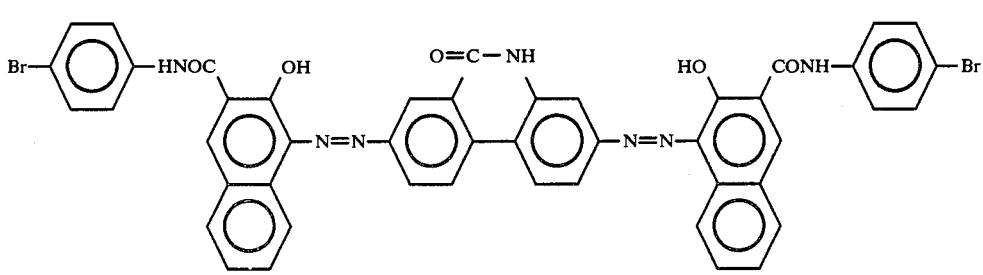
10.
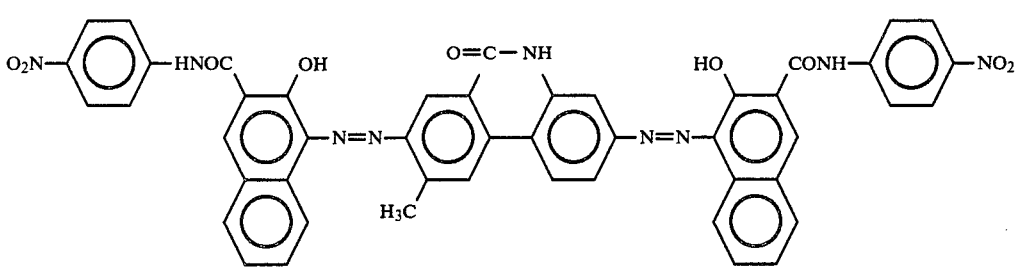
11.
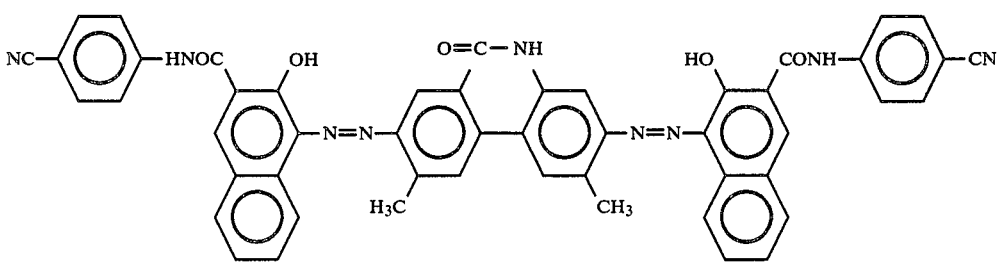
12.

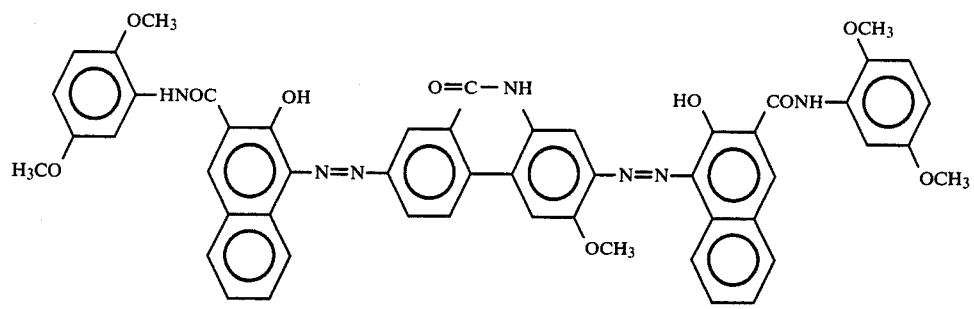
13.
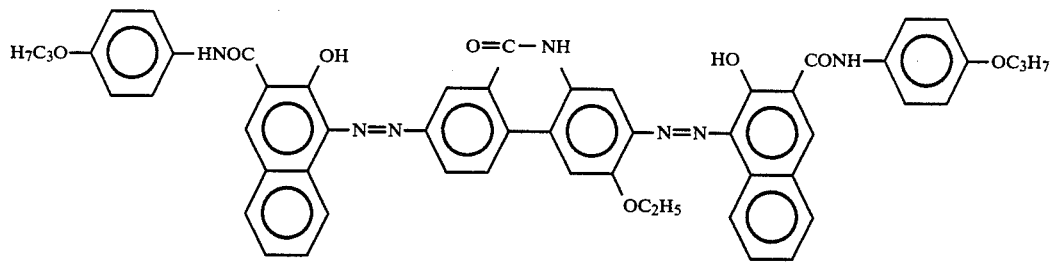
14.
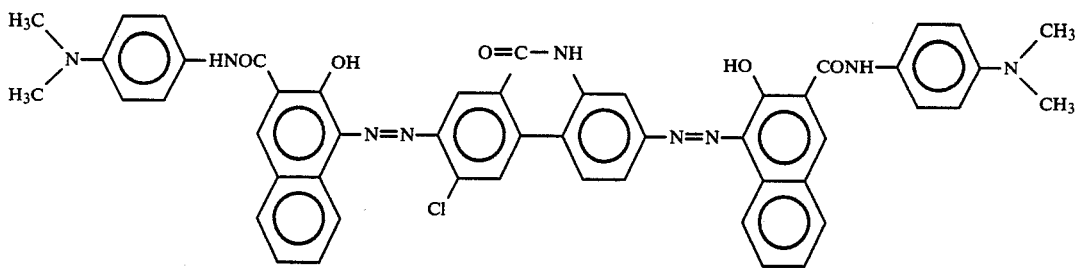
15.
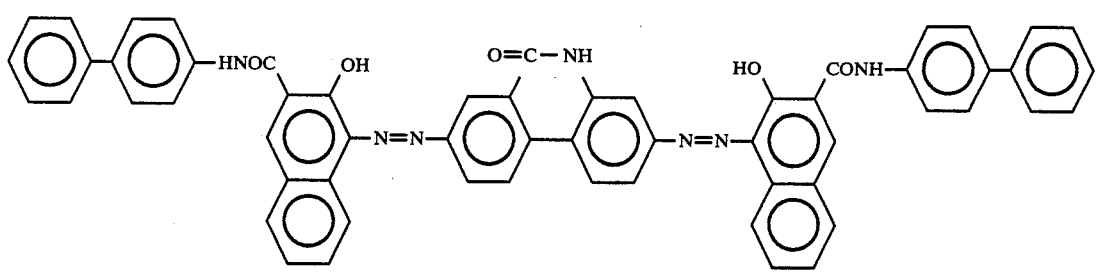
16.
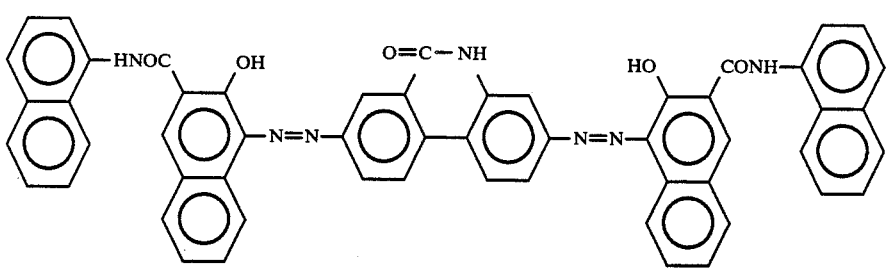
17.
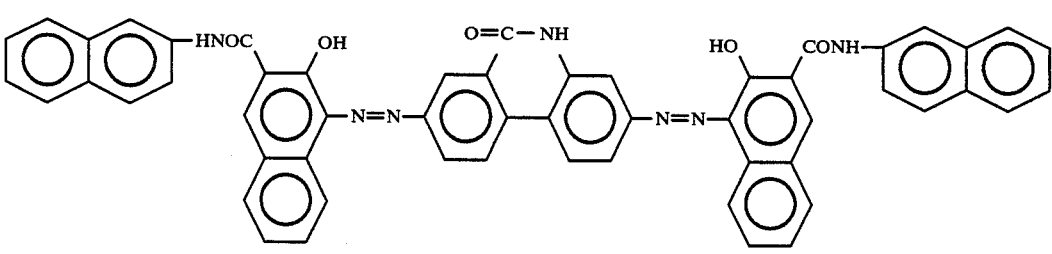
18.

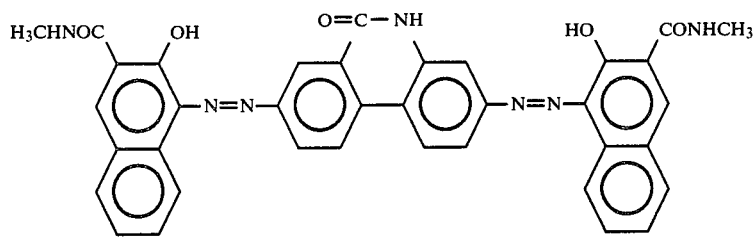
19.
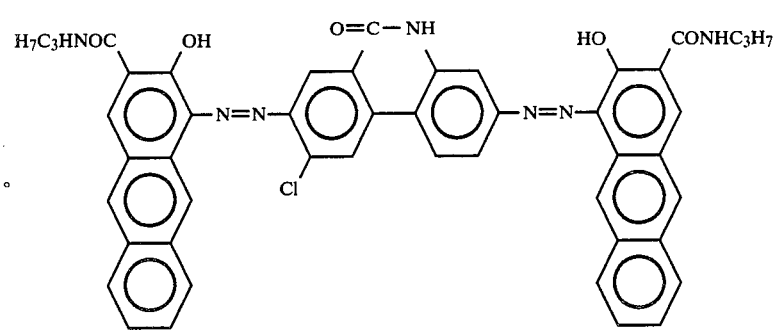
20.
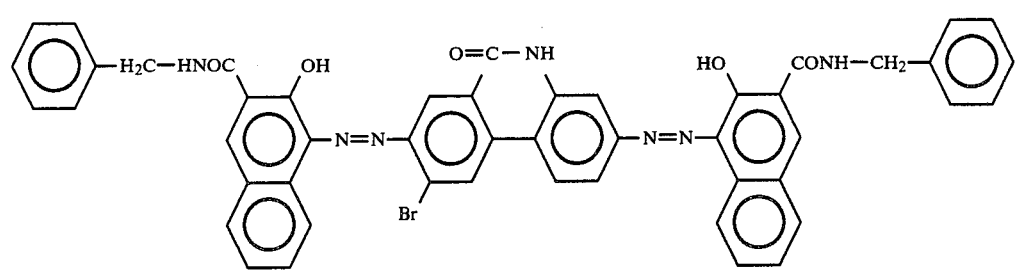
21.
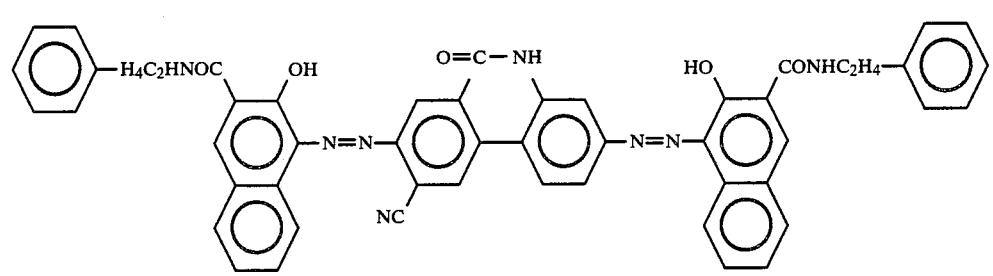
22.
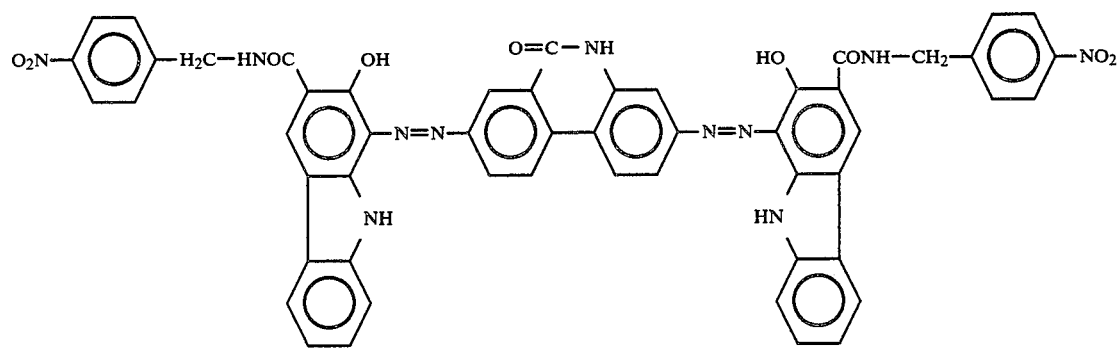
23.

-continued
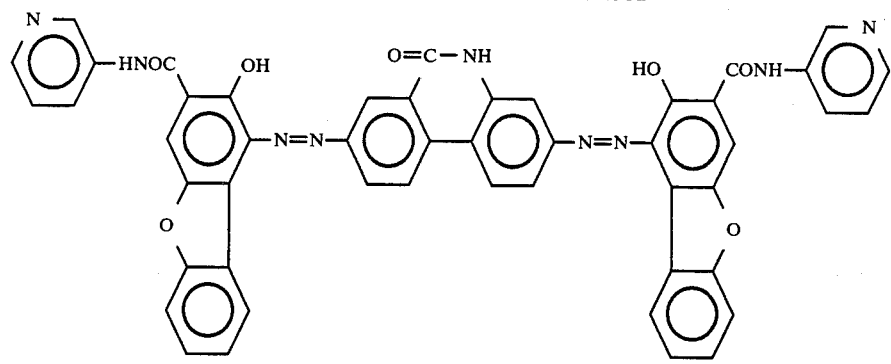
24.
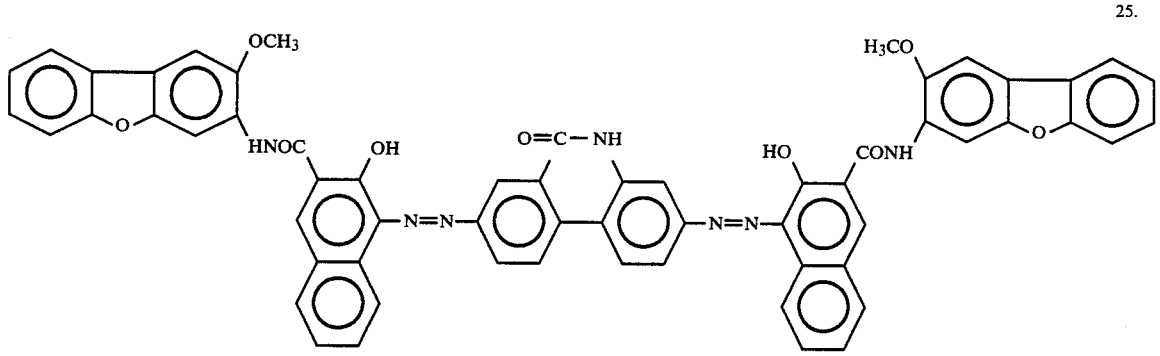
25.
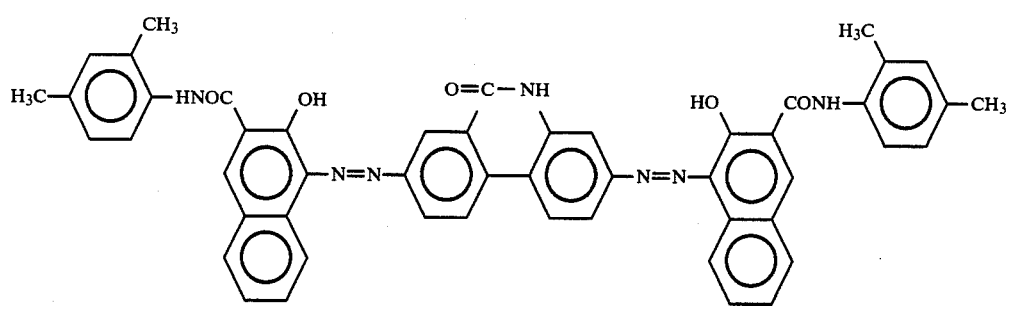
26.
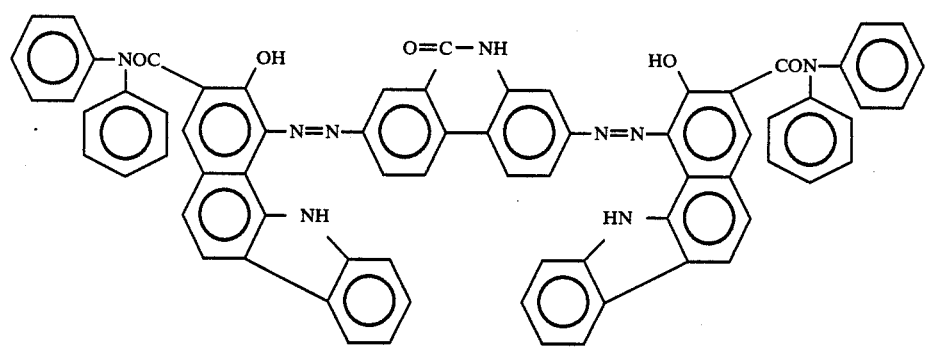
27.
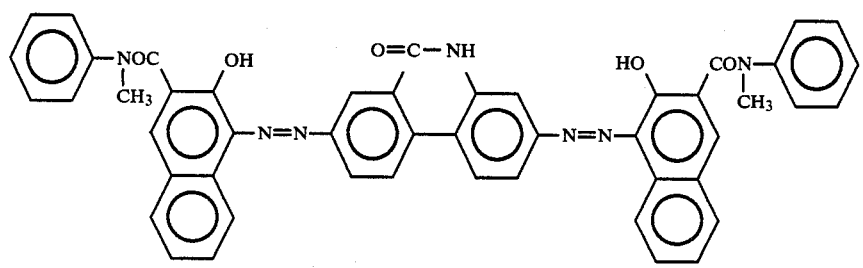
28.

-continued
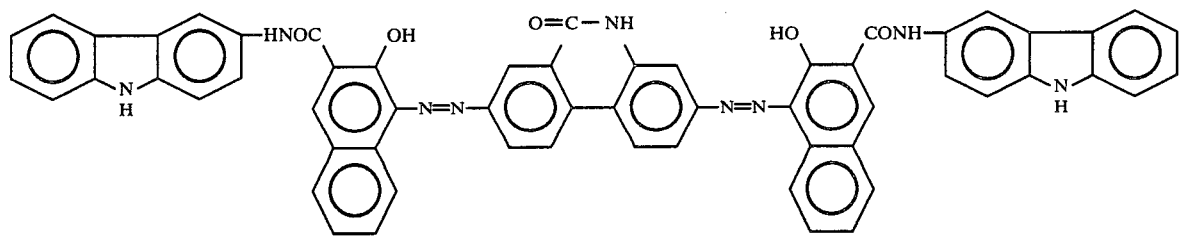
29.
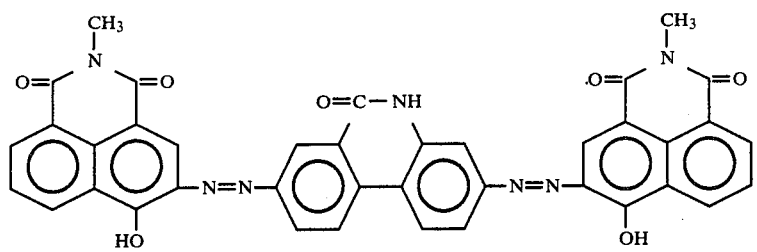
30.
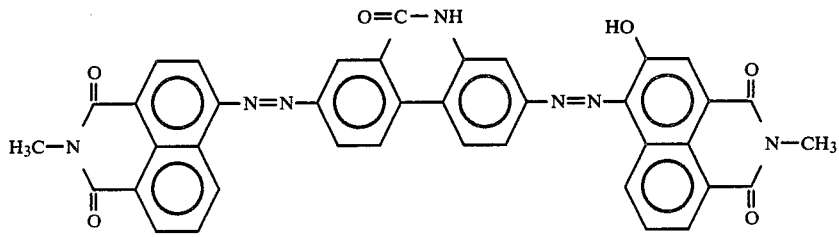
31.
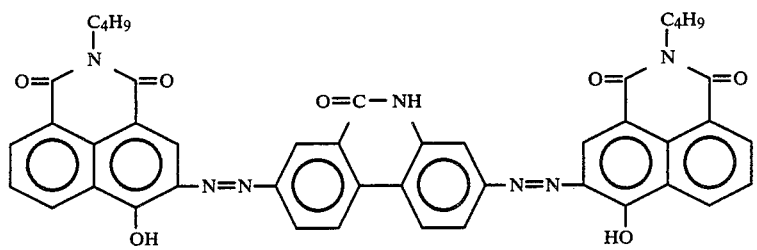
32.
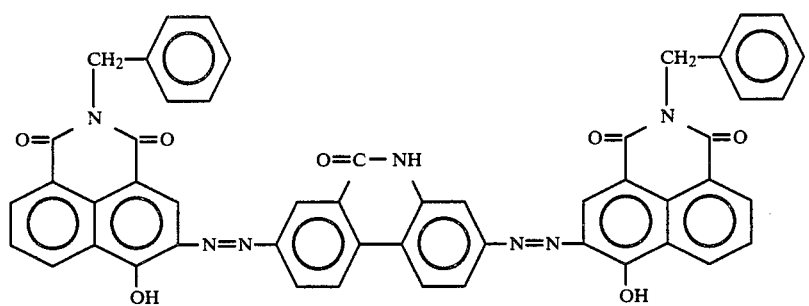
33.
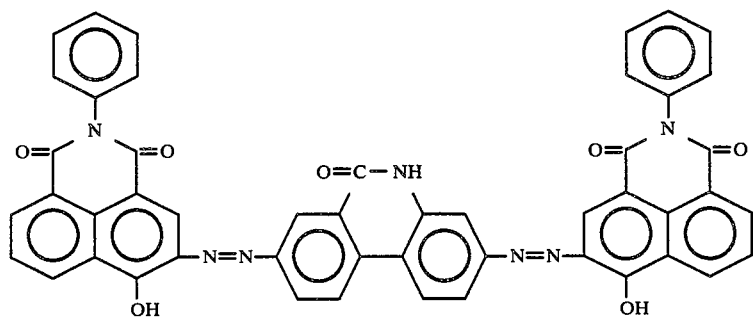
34.

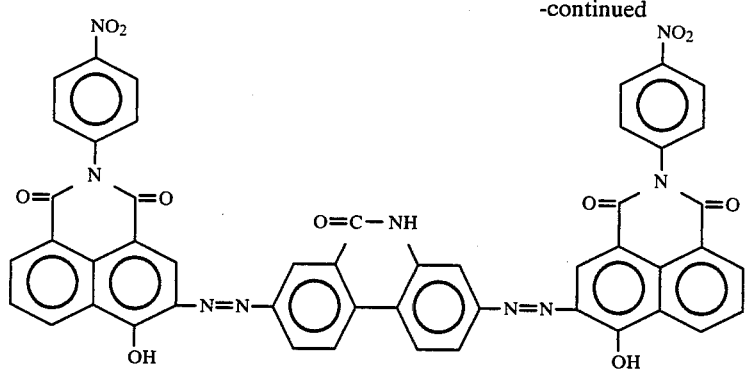

35.

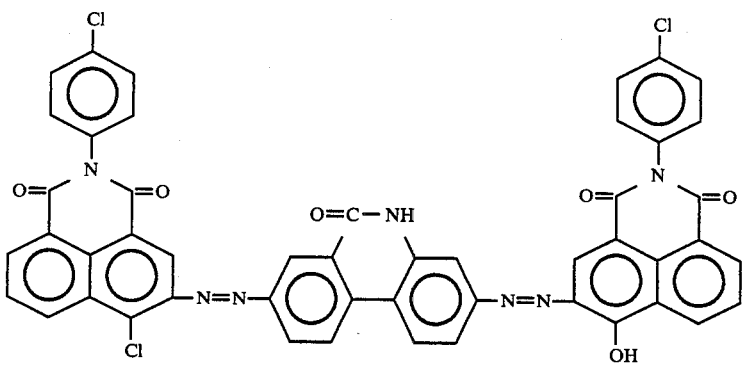

36.

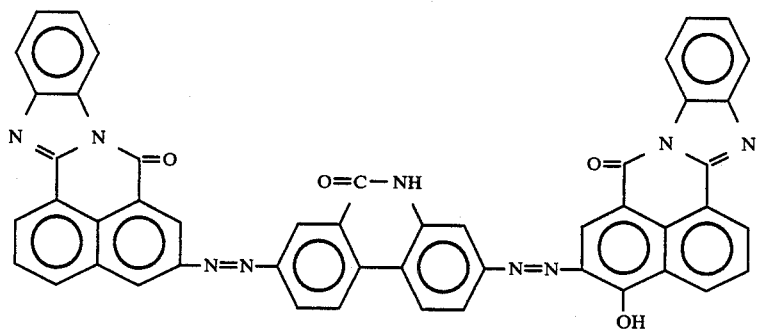

37.

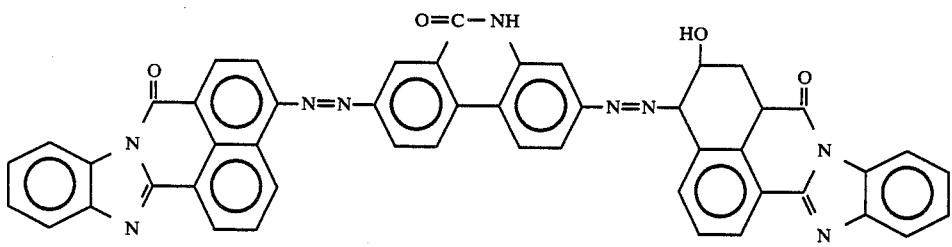

38.

These disazo pigments may be used either singly or as a combination of two or more compounds. These pigments can be easily prepared by tetrazotizing a diamine represented by the formula:

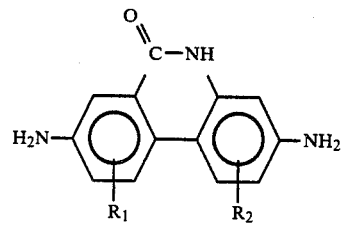

(7)

wherein $R_1$ and $R_2$ in the formula (1) have the same meanings as in the formula (1), in a conventional manner and subsequently subjecting the corresponding coupler to coupling in the presence of an alkali, or alternatively by isolating once the tetrazonium salt of the above diamine with boron fluoride or zinc chloride, and then carrying out coupling with a coupler in the presence of an alkali in a solvent such as N,N-dimethylformamide, dimethyl sulfoxide, and the like.

SYNTHESIS EXAMPLE 1

(synthesis of the above exemplary disazo pigment No. 1)

80 ml of water, 16.6 ml (0.19 mole) of conc. hydrochloric acid and 6.5 g (0.029 mole) of

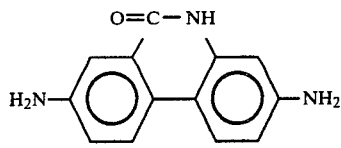

poured in a 500 ml beaker, and the mixture was stirred while cooling in an ice-water bath to be controlled to a temperature of 3° C. Next, a solution of 4.2 g. of sodium nitrite (0.061 mole) dissolved in 7 ml of water was added dropwise into the mixture while controlling its temperature at 3° to 10° C. over 10 minutes, and the mixture was further stirred for 30 minutes at the same temperature after completion of the dropwise addition. The reaction mixture was filtered with addition of carbon to obtain a tetrazotized solution.

Next, 21 g (0.53 mole) of caustic soda was dissolved in 700 ml of water in a 2-liter beaker, and then 16.2 g. (0.061 mole) of naphthol AS (3-hydroxy-2-naphthoic acid anilide) was added to be dissolved therein.

The coupler solution was cooled to 6° C. and, while controlling its temperature at 6° to 10° C., the above tetrazotized solution was added dropwise while stirring over 30 minutes, and the mixture was thereafter stirred for two hours at room temperature and further left to stand overnight. The reaction mixture was filtered and then washed with water to obtain 20.2 g of a crude pigment. Next, hot filtration was repeated 5 times with 400 ml of N,N-dimethylformamide, followed by hot drying under reduced pressure to give 18.2 g of a crude pigment. The yield was 81%.

|   | Elemental analysis: | |
|---|---|---|
|   | Calcd. (%) | Found (%) |
| C | 72.94 | 72.92 |
| H | 4.05 | 4.01 |
| N | 12.67 | 12.69 |

Having described about a specific systhesis method for the pigment of No. 1, other disazo pigments represented by the formula (1) can also similarly be synthesized.

According to a preferable example of the present invention, the dasazo pigment represented by the above formula (1) can be used as the charge generation substance in an electrophotographic photosensitive member in which the photosensitive layer is separated in functions to the charge generation layer and the charge transport layer. The charge generation layer contains the above organic photoconductive material as much as possible in order to obtain sufficient absorbance and it should preferably be made a thin film layer, for example, with a thickness of 5 microns or less, preferably 0.01 to 1μ, in order to make shorter the flight length of the charge carriers. This is because most of the quantity of the incident light is absorbed at the charge generation layer to generate much charge carriers, and the charge carriers generated are required to be injected into the charge transport layer without deactivation through recombination or trap.

The charge generation layer can be formed by dispersing the disazo pigment as described above in a suitable binder and applying the dispersion on a substrate by coating, or alternatively it can also be obtained by forming a vapor deposition film by means of a vacuum vapor deposition device. The binder which can be used in formation of a charge generation layer by coating can be selected from a wide scope of insulating resins or it can also be selected from organic photoconductive polymers such as poly-N-vinylcarbazole, polyvinylanthracene, polyvinylpyrene and the like. Preferably, there may be mentioned insulating resins such as polyvinyl butyral, polyallylate (polycondensate of bisphenol A and phthalic acid, etc.), polycarbonate, polyester, phenoxy resin, polyvinyl acetate, acrylic resin, polyacrylamide resin, polyamide, polyvinylpyridine, cellulose type resin, urethane resin, epoxy resin, casein, polyvinyl alcohol, polyvinyl pyrrolidone, etc. The resin contained in the charge generation layer may be suitably 80% by weight or less, preferably 40% by weight or less.

The solvent for dissolving these resins may differ depending on the resin employed, and it should be preferably selected from those which do not dissolve the following charge transport layer and subbing layer. Examples of organic solvents may include alcohols such as methanol, ethanol, isopropanol and the like, ketones such as acetone, methyl ethyl ketone, cyclohexanone and the like, amides such as N,N-dimethylformamide, N,N-dimethylacetamide and the like, sulfoxides such as dimethyl sulfoxide and the like, ethers such as tetrahydrofuran, dioxane, ethylene glycol monomethyl ether and the like, esters such as methyl acetate, ethyl acetate and the like, aliphatic halogenated hydrocarbons such as chloroform, methylene chloride, dichloroethylene, carbon tetrachloride, trichroethylene and the like, aromatics such as benzene, toluene, xylene, ligroin, monochlorobenzene, dichlorobenzene and the like.

Coating may be practiced according to various coating methods such as dip coating, spray coating, spinner coating, bead coating, Meyer bar coating, blade coating, roller coating, curtain coating, and the like. Drying may be conducted preferably by finger touch drying at room temperature, followed by heating drying. Heating drying can be performed stationarily or under air stream at a temperature of 30° to 200° C. within a period from 5 minutes to 2 hours.

The charge transport layer is connected electrically to the charge generation layer as described above, and has the function of receiving charge carriers injected from the charge generation layer in the presence of an electrical field and also transporting these charge carriers to the surface. In performing such functions, the charge transport layer may be laminated either on the charge generation layer or beneath thereof.

The substance for transporting the charge carriers in the charge transport layer (hereinafter called merely charge transport substance) should preferably be substantially nonresponsive to the wavelength region of the electromagnetic wave to which the charge generation layer as described above is responsive. The "electromagnetic wave" as herein mentioned is inclusive of "rays" in broad sense, including gamma-ray, X-ray, UV-ray, visible light, near IR-ray, IR-ray, far IR-ray, etc. When the light-responsive wavelength region of the charge transport layer coincides with or overlaps that of the charge generation layer, the charge carriers generated in both will trap each other, to cause consequently lowering in sensitivity.

The charge transport substance may include electron transporting substnaces and hole transporting substances. As the electron transporting substances, there may be employed electron attracting substances such as chloroanil, bromoanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone and the like or polymerized products of these electron attracting substances.

As the hole transporting substances, there may be employed pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine, hydrazones such as P-diethylaminobenzaldehyde-N,N-diphenylhydrazone, P-diethylaminobenzaldehyde-N-α-naphthyl-N-phenylhydrazone, P-pyrrolidinobenzaldehyde-N,N-diphenylhydrazone, 1,3,3-trimethylindolenine-ω-aldehyde-N,N-diphenylhydrazone, P-diethylbenzaldehyde-3-methylbenzthiazolinone-2-hydrazone and the like, 2,5-bis(P-diethylaminophenyl)-1,3,4-oxadiazole, pyrazolines such as 1-phenyl-3-(P-diethylaminostyryl)-5-(P-diethylaminophenyl)pyrazoline, 1-[quinolyl(2)]-3-(P-diethylaminostyryl)-5-(P-diethylaminophenyl)-pyrazoline, 1-[pyridyl(2)]-3-(P-diethylaminostyryl)-5-(P-diethylaminophenyl)pyrazoline, 1-[6-methoxy-pyridyl(2)]-3-(P-diethylaminostyryl)-5-(P-diethylaminophenyl)pyrazoline, 1-[pyridyl(3)]-3-(P-diethylaminostyryl)-5-(P-diethylaminophenyl)-pyrazoline, 1-[pyridyl(2)]-3-(P-diethylaminostyryl)-5-(P-diethylaminophenyl)pyrazoline, 1-[pyridyl(2)]-3-(P-diethylaminostyryl)-4-methyl-5-(P-diethylaminophenyl)-pyrazoline, 1-[pyridyl(2)]-3-(α-methyl-P-diethylaminostyryl)-5-(P-diethylaminophenyl)-pyrazoline, 1-phenyl-3-(P-diethylaminostyryl)-4-methyl-5-(P-diethylaminophenyl)pyrazoline, 1-phenyl-3-(α-benzyl-P-diethylaminostyryl)-5-(P-diethylaminophenyl)pyrazoline, spiropyrazoline, and the like, oxazole type compounds such as 2-(P-diethylaminostyryl)-6-diethylaminobenzoxazole, 2-(P-diethylaminophenyl)-4-(P-dimethylaminophenyl)-5-(2-chlorophenyl)oxazole and the like, thiazole type compounds such as 2-(P-diethylaminostyryl)-6-diethylaminobenzothiazole and the like, triarylmethane type compounds such as bis(4-diethylamino-2-methylphenyl)phenylmethane and the like, polyarylalkanes such as 1,1-bis(4-N,N-diethylamino-2-methylphenyl)heptane, 1,1,2,2-tetrakis(4-N,N-dimethylamino-2-methylphenyl)ethane and the like; triphenylamine, poly-N-vinylcarbazole, polyvinylpyrene, polyvinylanthracene, polyvinylacridine, poly-9-vinylphenyl-anthracene, pyrene-formaldehyde resin, ethylcarbazole-form-aldehyde resin, etc.

Other than these organic charge transport substances, it is also possible to use an inorganic material such as selenium, selenium-tellurium amorphous silicon, cadmium sulfide and the like.

These charge transport substances may be used either individually or as a combination of two or more compounds.

When the charge transport substance has no film forming property, a coating film can be formed by selection of a suitable binder. The resins available as the binder may include insulating resins such as acrylic resin, polyallylate, polyester, polycarbonate, polystyrene, acrylonitrile-styrene copolymer, acrylonitrile-butadiene copolymer, polyvinyl butyral, polyvinyl formal, polysulfone, polyacrylamide, polyamide, chlorinated rubber and the like or organic photoconductive polymers such as poly-N-vinylcarbazole, polyvinylanthracene, polyvinyl-pyrene and the like.

The charge transport layer cannot be made thicker than is necessary due to the restriction imposed by transportation of charge carriers. Its thickness is generally 5 to 30μ, but preferably 8 to 20μ. For formation of a charge transport layer by coating, any suitable coating method as described above may be employed.

The photosensitive layer having such a laminated structure of the charge generation layer and the charge transport layer may be provided on a substrate having an electroconductive layer. The substrate having an electroconductive layer may be one having itself electroconductivity such as aluminum, aluminum alloy, copper, zinc, stainless steel, vanadium, molybdenum, chromium, titanium, nickel, indium, gold or platinum, or otherwise a plastic (e.g. polyethylene, polypropylene, polyvinyl chloride, polyethyleneterephthalate, acrylic resin, polyfluoroethylene, etc.) having a layer of aluminum, aluminum alloy, indium oxide, tin oxide, indium oxide-tin oxide alloy, etc. coated according to the vacuum vapor deposition method, a substrate having electroconductive particles (e.g. carbon black, silver particles, etc.) together with a suitable binder coated on a plastic, a substrate comprising a plastic or a paper impregnated with electroconductive particles, or a plastic having an electroconductive polymer, etc.

Between the electroconductive layer and the photosensitive layer, it is also possible to provide a subbing layer having the barrier function and the adhesive function. The subbing layer can be formed of casein, polyvinyl alcohol, nitrocellulose, ethylene-acrylic acid copolymer, polyamide (nylon 6, nylon 66, nylon 610, copolymeric nylon, alkoxymethylated nylon, etc.), polyurethane, gelatin, aluminum oxide, etc. The subbing layer may have a thickness suitable of 0.1 to 5μ, preferably 0.5 to 3μ.

When employing a photosensitive member having the electroconductive layer, the charge generation layer and the charge transport layer laminated in this order, if the charge transport substance comprises an electron transporting substance, the surface of the charge transport layer is required to be positively charged and the electrons formed in the charge generation layer at the exposed portion will be injected into the charge transport layer by exposure after charging to reach thereafter the surface, where the positive charges are neutralized to give rise to decay of the surface potential, thereby creating electrostatic contrast between the exposed and the unexposed portions. The electrostatic latent image thus formed can be developed with a negatively charged toner to give a visible image. This can be fixed directly or, after transfer the toner image onto a paper or a plastic, developed and fixed.

Also, it is possible to employ a method in which the electrostatic latent image on the photosensitive member is transferred onto an insulating layer of a transfer paper, followed by developing and fixing. The kind of the developer, the developing method and the fixing method may any of known developers and known methods, which are not particularly limited.

On the other hand, when the charge transport substance comprises a hole transporting substance, the surface of the charge transport layer is required to be negatively charged and the holes generated in the charge generation layer at the exposed portion will be injected into the charge transport layer by exposure after charging, to reach thereafter the surface. At the surface the negative charges are neutralized to give rise to decay of the surface potential, thereby creating an electrostatic contrast between the exposed and unexposed portions. During development, it is necessary to use a positively chargeable toner as contrary to the case when employing an electron transporting substance.

Another example of the present invention is an electrophotographic photosensitive member containing the disazo pigment as described together with a charge transporting substance in the same layer. In this case, other than the charge transporting substances as described above, a charge transfer complex compound such as poly-N-vinylcarbazole or trinitrofluorenone can be used.

The electrophotographic photosensitive member according to this example can be prepared by dispersing the disazo pigment as described above and a charge transfer complex compound in a binder resin solution dissolved in tetrahydrofuran and thereafter forming a coating film.

In any of the photosensitive members, the pigment employed contains at least one pigment selected from the disazo pigments represented by the formula (1), and it is also possible to enhance the sensitivity of the photosensitive member used by combination with a pigment different in light absorption, combine two or more kinds of the disazo pigment represented by the formula (1) for the purpose of obtaining a panchromatic photosensitive member, etc., or use in combination with a charge generation substance selected from known dyes or pigments, if desired.

The electrophotographic photosensitive member of the present invention can be utilized not only for electrophotographic copying machines but also widely in the field of application of electrophotography such as laser printer, CRT printer and the like.

EXAMPLE 1

On an aluminum plate, an ammoniacal aqueous solution of casein (casein 11.2 g, 28% ammonia water 1 g, water 222 ml) was applied by Meyer bar to a film thickness after drying of $1.0\mu$, followed by drying.

Next, 5 g of the above exemplary disazo pigment No. 1 was added to a solution of 2 g of a butyral resin (degree of butyral formation: 63 mol %) dissolved in 95 ml of ethanol, and the mixture was dispersed by an attritor for 2 hours. The dispersion was applied by Meyer bar on the casein layer previously formed to a film thickness after drying of $0.5\mu$, followed by drying, to form a charge generation layer.

Subsequently, 5 g of P-diethylamino-2-bromobenzaldehyde-N-α-naphthyl-N-phenylhydrazone and 5 g of a polymethyl methacrylate resin (number average molecular weight: 100,000) were dissolved in 70 ml of benzene, and the resultant solution was applied by Meyer bar to a film thickness after drying of $12\mu$, followed by drying, to form a charge transport layer.

The electrophotographic photosensitive member thus prepared was subjected to corona charging at $\ominus 5$ KV by means of an electrostatic copying paper testing device Model SP-428 produced by Kawaguchi Denki K.K. (hereinafter abbreviated as a turn table), retained in a dark place for one second and thereafter exposed to light at an illuminance of 5 lux for testing of charging characteristics. As the charging characteristics, surface potential ($V_0$) and light exposure necessary for lowering the potential to half of the value just after dark decay for one second ($E_{\frac{1}{2}}$) were measured. The results are shown in Table 1.

On the other hand, for measurement of the fluctuations in the light portion potential and the dark portion potential when repeatedly used, the photosensitive member prepared in this Example was plastered on the cylinder of an electrophotographic copying machine equipped with a corona charger of $\ominus 5.6$ KV, an optical system having a facility of light exposure of 10 lux sec., a developer, a transfer charger, an optical system for deelectrifying light exposure and a cleaner. The copying machine is constructed so that an image can be obtained on a receiving paper by the working of the cylinder. By the use of this copying machine, the light portion potential ($V_L$) and the dark portion potential ($V_D$) at the initial stage and after repeated use of 5000 times were measured. The results are shown in Table 2.

TABLE 1

| |
|---|
| $V_0$: $\ominus$ 600 V |
| $E_{\frac{1}{2}}$: 3.2 lux · sec. |

TABLE 2

| Example | Initial stage | | After 5000 successive copying | |
|---|---|---|---|---|
| | VD | VL | VD | VL |
| 1 | $\ominus$ 620 V | $\ominus$ 20 V | $\ominus$ 640 V | $\ominus$ 40 V |

EXAMPLES 2–22

Electrophographic photosensitive members were prepared in entirely the same manner as in Example 1, except for using the disazo pigments shown below in Table 3 in place of the disazo compound used in Example 1.

The charging characteristics of the respective photosensitive members in both case of using the turn table (turn table characteristics) and of using the real machine (real machine characteristics) were measured according to the same method as described in Example 1. These results are shown in Table 4.

TABLE 3

| Example | Disazo pigment | Example | Disazo pigment |
|---|---|---|---|
| 2 | 2 | 13 | 19 |
| 3 | 3 | 14 | 20 |
| 4 | 5 | 15 | 21 |
| 5 | 6 | 16 | 22 |
| 6 | 7 | 17 | 29 |
| 7 | 9 | 18 | 30 |
| 8 | 11 | 19 | 31 |
| 9 | 12 | 20 | 34 |
| 10 | 13 | 21 | 37 |
| 11 | 16 | 22 | 38 |
| 12 | 17 | | |

TABLE 4

| | Turn Table Characteristics | | Real Machine Characteristics | | | |
| | | | Initial Stage | | After Repeat Use of 500 Times | |
| Example | $V_O$ (−V) | $E_{\frac{1}{2}}$ (lux · sec) | $V_D$ (−V) | $V_L$ (−V) | $V_D$ (−V) | $V_L$ (−V) |
| --- | --- | --- | --- | --- | --- | --- |
| 2 | 600 | 3.0 | 620 | 20 | 620 | 30 |
| 3 | 630 | 3.7 | 640 | 30 | 660 | 50 |
| 4 | 610 | 2.9 | 630 | 10 | 640 | 30 |
| 5 | 590 | 3.2 | 600 | 20 | 580 | 20 |
| 6 | 630 | 2.8 | 650 | 20 | 670 | 40 |
| 7 | 620 | 2.4 | 640 | 10 | 660 | 10 |
| 8 | 600 | 3.4 | 620 | 30 | 650 | 60 |
| 9 | 620 | 3.1 | 630 | 20 | 660 | 50 |
| 10 | 590 | 3.6 | 600 | 30 | 640 | 60 |
| 11 | 620 | 3.0 | 640 | 20 | 650 | 40 |
| 12 | 610 | 3.6 | 630 | 30 | 640 | 40 |
| 13 | 630 | 2.9 | 630 | 10 | 650 | 30 |
| 14 | 620 | 3.7 | 640 | 30 | 660 | 30 |
| 15 | 620 | 3.0 | 630 | 20 | 650 | 50 |
| 16 | 610 | 3.2 | 620 | 20 | 620 | 40 |
| 17 | 620 | 2.6 | 650 | 10 | 670 | 30 |
| 18 | 630 | 2.9 | 630 | 10 | 640 | 20 |
| 19 | 620 | 3.1 | 640 | 20 | 660 | 40 |
| 20 | 600 | 3.2 | 630 | 20 | 650 | 40 |
| 21 | 600 | 3.5 | 620 | 40 | 660 | 70 |
| 22 | 610 | 3.4 | 630 | 30 | 650 | 50 |

COMPARATIVE EXAMPLES 1-3

In place of the exemplary disazo pigment No. 2 used in Example 2, the following comparative pigments (Table 5) were used to prepare photosensitive members through the other procedures are entirely the same manner as in Example 2, and charging characteristics were measured to obtain the results shown in Table 6.

TABLE 5

| Comparative Example | Comparative disazo pigment No. | Structure |
| --- | --- | --- |
| 1 | 1 | (structure with HNOC, OH, Cl, N=N, phenyl/naphthyl groups) |
| 2 | 2 | (structure with HNOC, OH, H₃CO, OCH₃, N=N, phenyl/naphthyl groups) |
| 3 | 3 | (structure with CH₃-N imide, HNOC, OH, Cl, N=N groups) |

TABLE 6

| Comparative example | Turn table characteristics | | Real machine characteristics | | | |
|---|---|---|---|---|---|---|
| | | | Initial stage | | After 5,000 successive copying | |
| | $V_O$ (−V) | $E_{\frac{1}{2}}$ (lux · sec) | $V_D$ (−V) | $V_L$ (−V) | $V_D$ (−V) | $V_L$ (−V) |
| 1 | 600 | 6.3 | 620 | 120 | 700 | 200 |
| 2 | 620 | 6.1 | 630 | 100 | 710 | 190 |
| 3 | 600 | 6.4 | 610 | 140 | 710 | 230 |

All of the photosensitive members shown in Examples were found to have higher sensitivity than those employing known disazo pigments shown in Comparative examples, with verty little fluctuation in $V_D$ and $V_L$ during successive copying, thus providing to be good photosensitive members.

EXAMPLE 23

On the charge generation layer prepared in Example 1, a coating solution prepared by 5 g of 2,4,7-trinitro-9-fluorenone and 5 g of poly-4,4′-dioxydiphenyl-2,2-propanecarbonate (molecular weight: 300,000) in 70 ml of tetrahydrofuran was applied to a coated amount after drying of 10 g/m², followed by drying.

The electrophotographic photosensitive member thus prepared was subjected to measurement of the charging characteristics according to the same method as in Example 1. Charging was effected in positive polarity. The results are shown below.

$V_0$: +560 V, $E_{\frac{1}{2}}$: 4.1 lux·sec., Initial dark portion potential $V_D$: +580 V, Initial light portion potential $V_L$: +30 V, Dark portion potential after 5000 successive copying $V_D$: +610 V, Light portion potential after 5000 successive copying $V_L$: +60 V.

EXAMPLE 24

On the aluminum surface of an aluminum-vapor-deposited poly-ethyleneterephthalate film, a coating of polyvinyl alcohol with a film thickness of 1.1μ was formed.

Next, the dispersion of the disazo pigment was used in Example 1 was applied by Meyer bar on the polyvinyl alcohol layer previously formed to a film thickness after drying of 0.5μ, followed by drying, to form a charge generation layer.

Subsequently, a solution of 5 g of 1-[pyridyl(2)]-3-(P-diethylaminostyryl)-5-(P-diethylaminophenyl)pyrazoline and 5 g of a polyallylate resin (polycondensate of bisphenol A and terephthalic acid-isophthalic acid) dissolved in 70 ml of tetrahydrofuran was applied on the charge generation layer to a film thickness after drying of 10μ, followed by drying to form a charge transport layer.

The charging characteristics and the successive copying characteristics of the photosensitive member thus prepared were measured according to the same method as in Example 1. The results are shown below.

$V_0$: −610 V, $E_{\frac{1}{2}}$: 3.9 lux·sec., Initial dark portion potential $V_D$: −630 V, Initial light portion potential $V_L$: −30 V, Dark portion potential after 5000 successive copying $V_D$: −660 V, Light portion potential after 5000 successive copying $V_L$: −50 V.

EXAMPLE 25

On an aluminum plate with a thickness of 100μ, an ammoniacal aqueous solution of casein was applied and dried to form a subbing layer with a film thickness of 1.1μ.

Next, 5 g of 2,4,7-trinitro-9-fluorenone and 5 g of a poly-N-vinylcarbazole (number average molecular weight: 300,000) were dissolved in 70 ml of tetrahydrofuran to form a charge-transfer complex compound. The charge-transfer complex compound and 1 g of the above exemplary photoconductive material of disazo pigment No. 27 were added to a solution of 5 g of a polyester resin (Byron, produced by Toyobo) dissolved in 70 ml of tetrahydrofuran to be dispersed therein. The dispersion was applied on the subbing layer to a film thickness after drying of 12μ and dried.

The charging characteristics and the successive copying characteristics of the photosensitive member thus prepared were measured according to the same method as in Example 1. The results are shown below. Charging was effected in positive polarity.

$V_0$: +580 V, $E_{\frac{1}{2}}$: 4.9 lux·sec., Initial dark portion potential $V_D$: +600 V, Initial light portion potential $V_L$: +40 V, Dark portion potential after 5000 successive copying $V_D$: +630 V, Light portion potential after 5000 successive copying $V_L$: 70 V.

EXAMPLE 26

On the subbing layer applied on an aluminum plate as used in Example 1, the coating solution for charge transport layer used in Example 1 was applied by Meyer bar and dried to form a coating film with a thickness of 16μ.

Next, to a homogeneous solution consisting of:

| | |
|---|---|
| P—diethylaminobenzaldehyde-N,N—diphenylhydrazone | 45 g |
| Polymethyl methacrylate resin (number average molecular weight: 100,000) | 5 g |
| Monochlorobenzene | 800 ml, |

10 g of the exemplary disazo pigment was added, and the mixture was dispersed by a sand mill for 10 hours.

The resultant dispersion was applied on the charge transport layer previously formed according to the dipping method and dried to form a charge generation layer with a thickness of 5μ thereon.

According to entirely the same methods as in Example 1, measurement of charging was practiced to obtain the results shown below. Charging was effected in positive polarity.

Turn table characteristics: $V_0$: +610 V, $E_{\frac{1}{2}}$: 3.4 lux·sec.

Real machine characteristics: initially, $V_D$: −630 V, $V_L$: −30 V after 5000 successive copying, $V_D$: −650 V, $V_L$: −50 V.

As apparent from the above description, by the use of specific disazo pigments represented by the formula (1), the electrophotographic photosensitive members of the present invention are excellent in sensitivity and show little fluctuation of $V_D$, $V_L$ during repeated use.

We claim:

1. An electrophotographic photosensitive member, which comprises a photosensitive layer containing a disazo pigment represented by the formula shown below in a photosensitive layer:

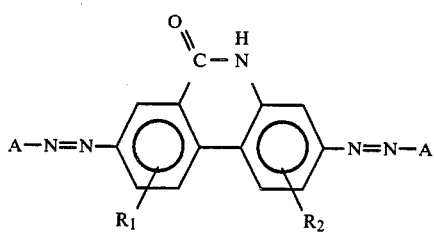   (1)

wherein $R_1$ and $R_2$, which may be either identical or different, each represent hydrogen atom, alkyl group, alkoxy group, halogen atom or cyano group, and A represents a coupler residue having a phenolic hydroxyl group.

2. An electrophotographic photosensitive member according to claim 1, wherein A in the formula (1) is represented by the formulae (2)–(6) shown below:

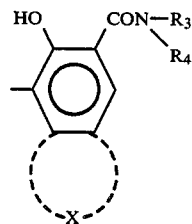   (2)

wherein X represents a residue necessary for formation of hetero ring or polycyclic aromatic ring such as naphthalene ring, anthracene ring, carbazole ring, benzcarbazole ring, dibenzofuran ring, benzonaphthofuran ring, diphenylenesulfide ring and the like through fusion with benzene ring; $R_3$ and $R_4$ represent hydrogen atom, alkyl group, aralkyl group, aryl group or heterocyclic group or cyclic amino group together with the nitrogen atom to which $R_3$ and $R_4$ are bonded which may be substituents,

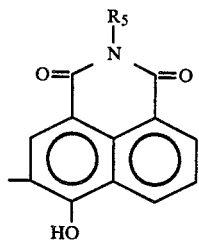   (3)

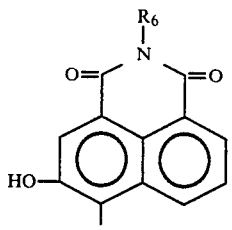   (4)

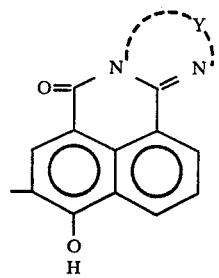   (5)

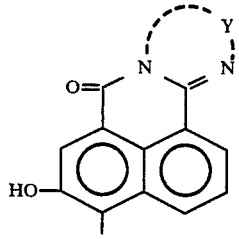   (6)

wherein $R_5$ and $R_6$ in the formulae (3) and (4) represent alkyl group, aralkyl group or aryl group which may have substituents, and Y in the formulae (5) and (6) represent divalent group of aromatic hydrocarbon or divalent group of heterocyclic ring containing nitrogen atom within the ring.

3. An electrophotographic photosensitive member according to claim 1 or claim 2, which comprises at least three layers of an electroconductive layer, a charge generation layer containing a disazo pigment represented by the formula (1) and a charge transport layer.

4. An electrophotographic photosensitive member according to claim 3, wherein the charge generation layer is formed by dispersing a disazo pigment represented by the formula (1) in a binder resin.

5. An electrophotographic photosensitive member according to claim 3, wherein the thickness of the charge generation layer is 0.01–1μ.

6. An electrophotographic photosensitive member according to claim 3, wherein the thickness of the charge transport layer is 5–30μ.

* * * * *

UNITED STATES PATENT AND TRADEMARK OFFICE
CERTIFICATE OF CORRECTION

PATENT NO. : 4,610,943
DATED : SEPTEMBER 9, 1986
INVENTOR(S) : TAKAO TAKIGUCHI, ET AL.

It is certified that error appears in the above-identified patent and that said Letters Patent is hereby corrected as shown below:

COLUMN 18

Line 45 to 48, " 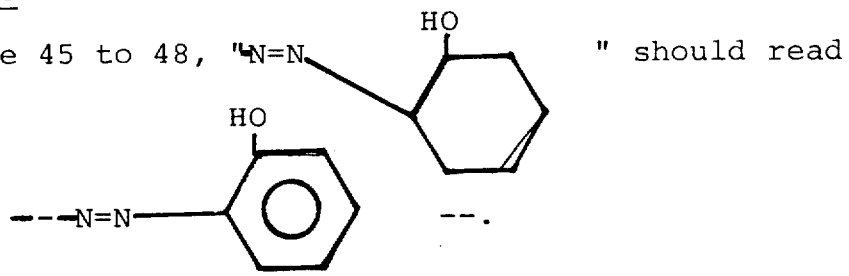 " should read --

--N=N-- ⌬ --.

COLUMN 26

Line 19, "through" should read --though--.

Signed and Sealed this

Tenth Day of March, 1987

Attest:

DONALD J. QUIGG

Attesting Officer      Commissioner of Patents and Trademarks